July 28, 1936.　　　　G. W. FORD　　　　2,048,691
HOLDER FOR CINEMATOGRAPH FILMS AND THE LIKE
Filed July 6, 1931
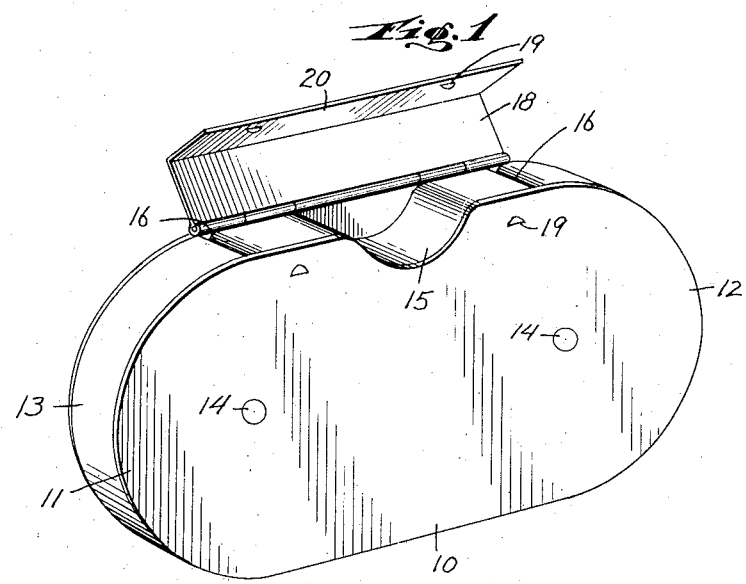
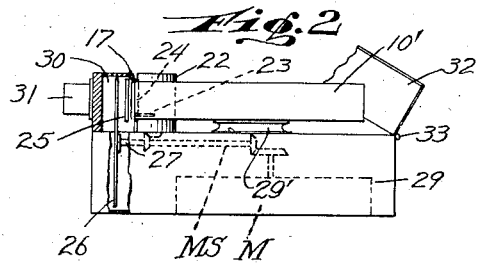
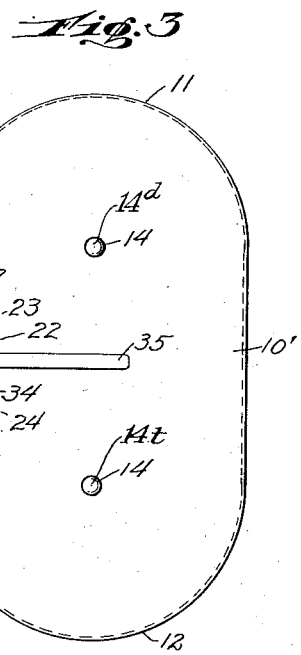
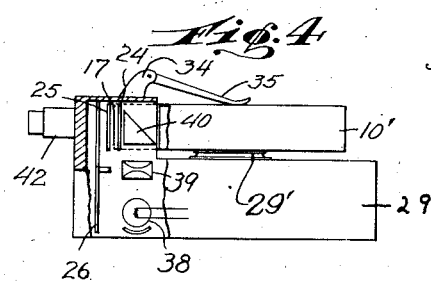
INVENTOR.
GEORGE WILLIAM FORD.
BY Waldo G. Morse
ATTORNEY Patented July 28, 1936

2,048,691

UNITED STATES PATENT OFFICE 2,048,691

HOLDER FOR CINEMATOGRAPH FILMS AND THE LIKE

George William Ford, Kensington, London, England, assignor to Kinatome Patents Corporation, New York, N. Y., a corporation of New York Application July 6, 1931, Serial No. 549,067
In Great Britain December 16, 1924

24 Claims. (Cl. 88—17)

This invention is for improvements in or relating to holders or cases, for cinematograph films and the like of the type which can be used as a container for the film to protect it during storage or handling, and also serve as its carrier when in use in a projector or camera, the holder being so constructed that it is simply inserted into the cinematograph machine when it is desired to use the film. Such film-holders are constructed as flat boxes in which are mounted two rollers or spools to which the film is permanently attached, and these rollers are so positioned, i. e. with their axes parallel, that the film can be transferred from one to the other without undergoing any twist. The rollers or spools are so formed as to engage with driving devices when the holder is inserted in position in a camera or projector.

According to the present invention a film-carrying case of the type above described, that is to say, a case wherein the film is mounted on two rollers and which can be used for storage purposes or in a projector or in a camera, is constructed without any light passage through it. When the case is inserted in a projector, a section of the film is inserted in the gate for engagement by the usual feeding means and other mechanism of the projector in such a manner as to permit the beam of light for projection to pass through the film. When the case is placed in a camera, the film, without necessarily being displaced from the position it maintains while the case is used for storage, slips into the gate ready for operation without handling. Any suitable means may be used for protecting the exposed portion of the film or of the leader employed therewith, and according to another feature of the invention this protection may be afforded by means of an adjustable cover mounted on the case adjacent the exposed portion of the film, the cover being preferably so shaped as to provide a complete enclosure therefor when the film is not in use.

The present application is a continuation in part of my copending application Serial Number 72,855, filed December 2, 1925, maturing as Patent Number 1,944,023.

According to an important feature of the invention, that portion of the outside wall of the casing which is between the two openings in it and against which the exposed portion of the film lies, is provided with a recess or is shaped re-entrantly so as to provide access to the rear side of the film. This arrangement facilitates the adjustment of the film when it is being inserted in a cinematograph machine, permitting the easy insertion of the finger of the operator to draw out the film, or its engagement with a suitable guide on the projector or camera by means of which the film is conducted into the gate; the said recess may be closed on one of its sides by an extension of one of the flat walls of the complete casing.

Another feature of the present invention resides in the combination in a cinematograph projector, with a film-carrying case as above set forth, of a reflector which is situated within the loop of film exposed between the two openings of the case, whereby indirect lighting of the film is effected for the purpose of projection. With this arrangement, the source of light can be placed to one side of the film-carrying case and gate mechanism, and a length of film only sufficient to provide accommodation for a small prismatic or other reflector need be drawn out from the casing.

Another important feature of the present invention resides in the construction of the recess in the film carrying case sufficiently large so that the reflector of the above mentioned projector, a gate member and a portion of the feeding means of the same may be accommodated within the recess so that no additional length of film whatever need be drawn out of the case, as will be readily apparent from the drawing.

In the accompanying drawing:

Figure 1 is a perspective view showing one construction of film-carrying case in accordance with the present invention;

Figure 2 is a side view, broken away in part showing the invention as applied to a camera with the film engaging mechanism of the apparatus disposed within the recess of the magazine.

Figure 3 is a schematic view looking at the structure of Figure 2 at right angles to the plane of the film path through the structure. Certain parts of the apparatus shown in Figure 2 are omitted from Figure 3 and a guiding and clamping finger of the invention is shown in this view which is omitted from Figure 2.

Figure 4 corresponds to Figure 2 but shows the invention as applied to a projector and broken away in part.

Referring first to Figure 1, the film-carrying case 10 is a flat shallow container which is preferably made of thin metal. Its sides each consist of flat plates having approximately semicircular ends 11, 12. These two plates are connected together by a wall forming the edge, i. e. the sides and ends of the container, as indicated at 13. A roller or spool is rotatably mounted at the center of each of the semi-circular portions, and the spindles of these rollers may extend through openings 14 for connection with apparatus whereby they are driven, or whereby one of them is so driven.

On one of the sides of the container there are provided two openings 16, which may have any suitable light-traps such as are customarily used with films, and the film which is secured to each of the rollers aforesaid extends out of one of these openings and in at the other as indicated at 17. A sheet metal cover 18 is provided for the casing and is adapted to cover that portion of the edge of the casing along which the film is exposed, so that when the cover is closed down the film is entirely enclosed and protected against risk of fire or other damage. Preferably the cover 18 is hinged to the case and is provided with any suitable detents or snap-fastenings 19 which will retain it in its closed position. A recess or notch 15 may be situated between the two openings 16 so that the film 17 extends across it, such notch providing for the easy insertion of the finger of the operator to draw out a length of the film when desired, or fitting about one of the gate members and other parts of the cinematograph machine when such machine is so constructed that the film passes in a substantially straight line from one opening to the other. When this notch is used the cover 18 is preferably provided with a flange 20 which is of such a depth as to constitute a complete closure for the recess when the cover is closed.

Figures 2, 3, and 4 illustrate my magazine as cooperating with a camera or projector. As will be observed from these figures, the recess 15 accommodates a housing 22, semi-circular in cross section, within which the film moving member 23 may be positioned. One of the gate sections 24 is placed adjacent one edge of this housing, the member 23 working through an appropriate opening therein. The other and apertured gate section 25 is placed slightly forwardly of the section 24 or to the left as viewed in the drawing so that when the two portions are separated as the carrier is placed into position upon the spindles 14d and 14t the film itself without being drawn out from the case for any distance is positioned in the appropriate space between such gate sections. After the film has been inserted between the gate sections, said sections are maintained in operative relation with each other and the film therebetween in any conventional or well-known manner. The usual shutter 26 may be provided mounted as upon the shaft 27 and operated by mechanism, such as a spring motor M having a shaft Ms, positioned within the casing 29, such mechanism likewise operating the moving member 23 and the take-up spindle 14t cooperating with the opening 14. Since these parts of the cinematograph machine form no part of the new structure of the invention, they are not described in detail. An appropriate housing 30 may be provided forwardly or to the left of the housing 22, as viewed in the figures. Upon such housing 30, the conventional objective lens 31 may be mounted. A cover 32 hinged to the casing 29 at 33 as shown in Figure 2 may be provided whereby the film is protected from light when the camera is being operated. The engagement of the spindles in the holes 14 and the arrangement of the case 10' for engagement with a mounting element 29' of the casing 29 serves to hold the case 10' in operative position on the apparatus.

Figure 4 illustrates my invention as applied to a projector. Referring to this figure, the source of light 38 may be arranged in a closed chamber situated adjacent the operating unit for the film. The light is passed through a suitable condenser 39 in the wall of the chamber and is reflected by suitable means, such as a prismatic reflector 40 situated immediately between the gate section 24, behind which and the gate plate 25 the film is passed. The projecting lens is indicated at 42.

In order to facilitate the insertion of the film into the gate, there may be provided guiding means, adjustable or otherwise.

If desired, such means may comprise a fixed guide member 34 over which the film is threaded, and according to another feature of the invention this guide member may be provided with adjustable finger or extension 35, hinged to the member 34, which can be swung upwardly to form a guiding surface cooperating with that of the member 34. This finger 35 can be inserted in the notch 15 behind the film, so that the act of placing the film-carrying case 10' into position automatically directs the film between the gate plates 24 and 25. When this position has been reached, the finger 35 is pushed down to retain the film-carrying case 10' in its correct position. Any suitable spring control may be provided on this finger 35 to hold it in the two positions to which it is adjustable. Such guiding means may be applied to either camera or projector, and is illustrated in Figure 3 as applied to a camera and in Figure 4 as applied to a projector.

It will be readily understood, however, by those skilled in the art that in view of the fact that the film is not necessarily displaced from the straight line between the openings 16, this adjustable finger may be dispensed with. Oppositely curved extensions projecting upwardly from the gate sections 24 and 25 may be provided, if desired.

An important advantage of the film-carrying case constructed in accordance with this invention is that the over-all dimensions of the case can be reduced to a minimum, for the axes of the rollers can be arranged a shorter distance apart in the casing than in the film-carrying holders above described, since there is no need to provide space for the light passage through the film-case. Furthermore, it will be appreciated that the axes of the two rollers may be spaced apart a distance less than twice the distance of either roller from the adjacent semicircular end of the casing, since the full length of the film is either wound on one roller or distributed between the two rollers; if flanges are provided on these rollers, the flanges may overlap one another while still providing adequate accommodation for the film.

Further, it will be seen that this film-carrying case lends itself particularly to the use of indirect or reflected illumination of the film, which arrangement is advantageous in reducing the length of film which is exposed during its use.

A related and important advantage of this film-carrying case is that in the insertion of the film in the camera or projector or its removal therefrom, the film is not necessarily displaced from the position which it assumes while the case is being used for storage or transportation purposes and hence need not be handled by the operator or drawn out of the casing during threading. Thus the danger of fogging a light sensitive film or of injuring the first or last portion of a positive film, which portions are always subjected to maximum wear, is minimized. It will be readily understood that the protective casing 20 need not be removed from its protective relation to the film until just an instant before the camera is placed in operation.

It will be appreciated that the invention is not limited to the specific constructions hereinbefore described, and also that other details of construction of film-carrying cases such as are necessitated by the conditions of use and are commonly employed, may be used in connection with the present invention, and have not herein been described in detail.

Finally, it is to be understood that the expression "cinematograph films and the like" is intended to cover any films for use in a camera or projector, and whether used for motion pictures or still pictures, and "cinematographic apparatus" covers a machine used for the exposure or projection of pictures.

I claim:

1. In combination, film handling apparatus and a film carrying case for use therewith, said case comprising a substantially flat container having parallel top and bottom walls joined by side walls at substantially right angles thereto, one of said side walls having aligning openings therein for exposing a length of film therebetween and being formed with a recess in said last previously mentioned side wall between such openings across which such exposed length of film extends, said apparatus including means for predeterminedly positioning said case thereupon, a supporting body so disposed upon said apparatus in relation to said positioning means that upon the placing of said case upon said positioning means said supporting body is situated within such recess formed in said side wall, a film contacting and guiding surface supported by said supporting body immediately in front thereof whereby the film, when said case is placed upon said apparatus with the film extending between said openings and in contact with said surface, is not materially displaced from a straight line, and a member for feeding the film, said member being so disposed that it passes through the plane of said surface and into operative contact with the film.

2. In a film handling apparatus having film feeding means, in combination, a housing for enclosing said feeding means, and a film carrying case housing both the delivery and take-up coils of the film and adapted to be inserted into said apparatus for exposing or projecting the film carried thereby, said case including a top and bottom wall spaced apart, and an enclosing side wall having two openings therethrough for exposing a length of film extending therebetween and between said coils, the side wall portion between said openings being formed with a recess, said housing having a protruding portion which conforms to the contour and size of said recess so that upon the mounting of said case in said apparatus said protruding portion fits compactly in said recess and a relatively small amount of space in said apparatus is thereby required for receiving said case.

3. In a film handling apparatus having a film feeding means, in combination, a housing for enclosing said feeding means, and a film carrying case adapted to house both the delivery and take-up coils of a film and to be inserted into said apparatus for exposing or projecting the film carried thereby, said case including a top and bottom wall spaced apart, and an enclosing side wall having two openings therethrough for exposing a length of film extending therebetween and from one of said coils to the other, the side wall portion between said openings being formed with a recess, said apparatus also including means for positioning said case thereupon, and said housing having a protruding portion which conforms to the contour and size of said recess and is so placed in relation to said positioning means that upon the mounting of said case in said apparatus said protruding portion fits compactly in said recess and a relatively small amount of space in said apparatus is thereby required for receiving said case, said recess being positioned to occupy space in the valley formed between the film coils whereby the size of the film case is unaffected by provision of said recess, and cooperates with said positioning means to maintain said case upon the apparatus.

4. In combination, film handling apparatus and a film carrying case adapted to be inserted into said apparatus for the projection or exposure of the film carried thereby or removed therefrom for the storage of the film, said case being adapted to house both the delivery coil and the take-up coil of a film and comprising a container having parallel top and bottom walls joined by side walls at substantially right angles thereto, at least one of said parallel walls being formed with spindle receiving openings therein and one of said side walls being formed with two openings therein so that a length of the film is exposed between such openings and may be fed from one toward the other thereof and said side wall being formed with a recess therein disposed between such openings across which said exposed length of film extends, said side walls being so formed between said openings that they are light-tight; and said apparatus including spindles adapted for introduction into such openings whereby the film is coiled upon one thereof, a member for engagement with such exposed length of film for the purpose of feeding the film from one of said openings toward the other and toward the coil being formed by said spindle, said member being so placed upon said apparatus in relation to said spindles that it is disposed within said recess when said case is operatively positioned upon said spindles whereby the film is fed from one of said openings toward the other without substantial displacement from a relatively straight path therebetween, and means for continuously maintaining the film in operative relation with said feeding member.

5. In combination, a film containing magazine and a film handling apparatus, said magazine including edge walls constructed with aligning openings to permit the passage of film therebetween exteriorly of said magazine, said edge walls being characterized by a recess formed therein between such openings, a support for said magazine upon said apparatus so arranged that said magazine may be mounted in a predetermined operative position thereupon, a supporting structure so placed upon said apparatus in relation to said magazine-support that while said magazine is positioned upon said support said supporting structure is situated within said recess, means for longitudinally moving the film across said recess, said feeding means being mounted adjacent said supporting structure and so placed upon said apparatus in relation to said magazine support that while said magazine is positioned upon said support said feeding means is positioned within said recess, a film contacting and guiding surface supported upon said supporting structure immediately in front thereof and adjacent the outer periphery of said recess, and means for continuously maintaining said film contacting and guiding surface in contacting and guiding relation to the film during the longitudinal movement thereof.

6. A combination according to claim 5, said apparatus including light reflecting means positioned between such path and such pre-determined position for said magazine upon said apparatus and adapted for passing light to or from the film while the film is maintained by said member in such path.

7. A combination according to claim 5, said apparatus including light reflecting means positioned between such path and such pre-determined position for said magazine upon said apparatus, a lens cooperating with said light reflecting means for directing light in respect thereto, and means disposed upon said apparatus for guiding the film into operative position relatively to said member during the placing of said magazine upon said support whereby the film is disposed in such path and in cooperative relation to light passed by said reflecting means.

8. In combination, a film carrying case and a film handling apparatus, said case being adapted to house both the delivery coil and the take-up coil of a film and to be inserted into said apparatus for the exposure or projection of the film carried thereby, said case including a top and a bottom wall spaced apart and an enclosing side wall having two spaced openings for exposing a length of film extending therebetween and passing from one of said coils to the other thereof, the portion of the side wall between said openings being formed with a re-entrant recess across which said exposed length of film passes, and said apparatus having means for predeterminedly positioning said case thereupon and a structure of such size and contour and so disposed upon said apparatus that while said case is positioned upon said apparatus said structure is disposed within said recess, the forward portion of said structure including a film contacting surface disposed across the opening of said recess for guiding the film thereacross and between said openings of said case and the other or rearward portion of said structure bearing against the inner portion of said recess for cooperating with said positioning means for maintaining said case in the desired operative position upon said apparatus.

9. In combination, film handling apparatus and a film carrying case adapted to house both the delivery coil and the take-up coil of a film and to be inserted into said apparatus for the projection or exposure of the film carried thereby or removed therefrom for the storage of the film, said case comprising a container having parallel top and bottom walls joined by side walls at substantially right angles thereto, at least one of said parallel walls being formed with spindle receiving means therein, the front side wall being formed with two openings therein so that a length of the film is exposed between such openings and may be fed from one toward the other in a substantially straight line, said front side wall being formed with a re-entrant concave portion between such openings across which re-entrant portion such exposed length of film extends and between said coils, said apparatus including a spindle adapted for cooperation with said spindle receiving means whereby the film may be coiled thereby and a housing for operable parts of the apparatus, said housing having a convex extension which in size and shape conforms to the size and shape of the concave re-entrant portion of said case and is so disposed in relation to said spindle that when said case is disposed upon said apparatus, said convex extension fits within said concave portion of said case thereby cooperating with said spindle to position said case upon said apparatus.

10. In combination, a film carrying case and a film handling apparatus, said case being adapted to house both the delivery coil and the take-up coil of a film and to be inserted into said apparatus for the exposure or projection of the film carried thereby, said case including a top and a bottom wall spaced apart and an enclosing side wall having two spaced openings for exposing a length of film extending therebetween and passing from one of said coils to the other thereof, the portion of the side wall between said openings being formed with a re-entrant recess across which said exposed length of film passes, and said apparatus including a casing, means for predeterminedly positioning said case thereupon, a first structure extending from said casing in a direction substantially normal thereto and of such size and contour and so disposed upon said apparatus that while said case is positioned upon said apparatus said structure is disposed within said recess, the forward portion of said structure including a film contacting surface disposed across the opening of said recess for guiding the film thereacross and between said openings of said case and the other or rearward portion of said structure bearing against the inner portion of said recess for cooperating with said positioning means for maintaining said case in the desired operative position upon said apparatus, and a second structure extending from the same side of said casing and in a direction substantially normal thereto, an apertured film contacting surface complementary to said previously mentioned film contacting surface supported upon said second structure, and a lens cooperating with the aperture of said apertured contacting surface supported upon said second structure, said second structure being so disposed in relation to said casing that said film contacting surfaces are disposed in parallel and adjacent relation with sufficient space therebetween for the introduction of the film therebetween as said case is being placed upon said apparatus.

11. A combination according to claim 10, said combination including a guiding member for directing the film into said space between said film contacting surfaces.

12. A combination according to claim 10, said combination including an operable guiding and clamping member mounted upon said apparatus and movable between a first position wherein it guides a film into the space intervening between said surfaces as said case is being placed upon said apparatus and a second position wherein it cooperates with a wall of said casing to clamp the case into the desired operative relation to said apparatus.

13. In combination, film handling apparatus and a film carrying case for use therewith, said case comprising a substantially flat container having parallel top and bottom walls joined by side walls at substantially right angles thereto, said side walls having openings therein for exposing a length of film therebetween and being formed with a recess between such openings across which such exposed length of film extends, said apparatus including means for maintaining said case in a predetermined operative position thereupon, a housing substantially conforming in cross section and dimension to that of said recess, an apertured gate section for cooperating with the length of film extending between such openings across said recess, light reflecting means positioned adjacent the aperture of said gate section, and a source for passing light to said light reflecting means for deflection thereby to said aperture, said gate section being disposed contiguously with the outer periphery of said housing and said light reflecting means being disposed within said housing between said gate section and the rear of said housing, and said housing being so disposed upon said apparatus in relation to said positioning means that it is situated substantially within such recess formed in said case and between said openings therein while said case is maintained in such predetermined position whereby the film while engaged by said gate section is not displaced from a substantially straight line position between said openings.

14. In combination, film handling apparatus and a film carrying case housing the delivery coil and the take-up coil of a film and adapted to be inserted into said apparatus for the projection or exposure of the film carried thereby or removed therefrom for the storage of the film, said case comprising a container having parallel top and bottom walls joined by side walls at substantially right angles thereto, at least one of said parallel walls being formed with spindle receiving openings therein, the front side wall being formed with two openings therein so that the length of the film extending between said coils is exposed between such openings and may be fed from one toward the other, said front side wall being formed with a re-entrant portion between such openings across which portion such exposed length of film extends, said re-entrant portion of said side wall being closed to light, said apparatus including spindles adapted for introduction into such spindle openings whereby the film may be coiled upon one of said spindles and the case predeterminedly positioned upon said apparatus, said apparatus further including a member extending from one side of said case into said re-entrant side wall portion for engagement with such exposed length of film for the purpose of feeding the film from one of said openings toward the other and toward the coil being formed by said last mentioned spindle, said feeding member being so placed upon said apparatus in relation to said spindles that it is disposed adjacent the film across said re-entrant portion when said case is operatively positioned upon such spindles whereby the film is fed from one of said openings toward the other without substantial displacement from a relatively straight path therebetween, said apparatus further including a housing for said feeding member conforming to the contour of said re-entrant portion of said side wall thereby engaging closely thereagainst and cooperating with said spindles for positioning said case upon said apparatus.

15. In combination, film handling apparatus and a film carrying case housing the delivery coil and the take-up coil of the film and adapted to be inserted into said apparatus for the projection or exposure of the film carried thereby or removed therefrom for the storage of the film, said case comprising a container having parallel top and bottom walls joined by side walls at substantially right angles thereto, at least one of said parallel walls being formed with spindle receiving openings therein and the front side wall being formed with two openings therein so that the length of the film extending between said coil is exposed between such openings and may be fed from one toward the other, said front side wall being formed with a re-entrant portion between such openings across which portions such exposed length of film extends, said re-entrant portion of said side wall being closed to light, said apparatus including spindles adapted for introduction into such spindle openings whereby the film may be coiled upon one of said spindles, said apparatus further including a member extending from one side of said case into said re-entrant side wall portion for engagement with such exposed length of film for the purpose of feeding the film from one of said openings toward the other and toward the coil being formed by such spindle, said feeding member being so placed upon said apparatus that it is disposed adjacent the film across said re-entrant portion when said case is operatively positioned whereby the film is fed from one of said openings toward the other without substantial displacement from a relatively straight path therebetween, said apparatus further including a housing for said feeding member conforming to the contour of said re-entrant portion of said side wall thereby engaging closely thereagainst and serving operatively to position said case in said apparatus, said apparatus further including a film case retaining member for engaging said case in cooperation with said housing for holding said case in operative position upon said apparatus.

16. In combination, a film handling apparatus and a film carrying case, said case being adapted to house the delivery coil and the take-up coil of a film and to be inserted into said apparatus for exposing or projecting the film carried thereby, said case including a top and a bottom wall spaced apart, and an enclosing side wall having two openings therein for exposing a length of film extending therebetween and between said delivery and take-up coils, the side wall portion between said openings being formed with a recess across which said length of film passes in substantially a straight line; said apparatus including film feeding means, driving means for said feeding means, means for positioning said case upon said apparatus, and a housing, said housing having an upper protruding compartment which conforms to the contour and size of said recess and is so disposed in relation to said positioning means that when said case is positioned upon said apparatus said protruding compartment fits compactly in said recess and a relatively small amount of space is thereby required for receiving said case, said compartment being disposed between said straight length of film and the wall of said recess when said case is positioned upon said apparatus, said film feeding means being disposed within said upper compartment and in operative relation with the film, said housing also having a lower compartment, said driving means for said feeding means being positioned in said lower compartment.

17. The combination of claim 16, characterized by said apparatus including a gate section arranged to form an element of said upper compartment and to guide the film between said openings when said case is disposed upon said apparatus.

18. In combination, a film carrying case and a film handling apparatus, said case being adapted to house both the delivery coil and the take-up coil of a film and to be inserted into said apparatus for the exposure or projection of the film carried thereby, said case including a top and a bottom wall spaced apart, said bottom wall having spindle receiving means, and an enclosing side wall having two spaced openings for exposing a length of film extending therebetween and passing from one of said coils to the other thereof, the portion of the side wall between said openings being formed with a re-entrant recess across which said exposed length of film passes, and said apparatus including a substantially flat compartment, a spindle extending from said compartment in a direction substantially normal thereto, a structure extending from said compartment in a direction substantially normal thereto and of such size and contour and so disposed upon said compartment in relation to said spindle that while said case is positioned upon said apparatus with said spindle in operative relation with said spindle receiving means of said case said structure is disposed within said recess with the periphery of said structure in contact with the wall of the case which forms said recess whereby said structure cooperates with said spindle in predeterminedly positioning said case upon said apparatus, and means within said compartment for driving said spindle.

19. In combination, a film carrying case and a film handling apparatus, said case being adapted to house both the delivery coil and the take-up coil of a film and to be inserted into said apparatus for the exposure or projection of the film carried thereby, said case including a top and a bottom wall spaced apart, and an enclosing side wall having two spaced openings for exposing a length of film extending therebetween and passing from one of said coils to the other thereof, the portion of the side wall between said openings being formed with a re-entrant recess across which said exposed length of film passes, and said apparatus including a substantially flat compartment, means upon said apparatus for positioning said case in predetermined relation to said compartment, a structure of such size and contour and so disposed upon said apparatus that while said case is positioned upon said apparatus said structure is disposed within said recess, the forward portion of said structure including a film contacting surface disposed across the opening of said recess for guiding the film thereacross and between said openings of said case and the other or rearward portion of said structure bearing against the inner portion of said recess for cooperating with said positioning means for maintaining said case in the desired operative position upon said apparatus, a member disposed upon said apparatus for feeding the film across said recess from one of said openings in said case to the other thereof, and means within said compartment for driving said feeding member.

20. A combination according to claim 19, said feeding member extending from said structure through an opening in said film contacting surface, said surface being provided with such an opening, and into driving relation with the film.

21. In combination, a film carrying case and a film handling apparatus, said film carrying case being adapted to house both the delivery coil and the take-up coil of a film and to be inserted into said apparatus for the exposure or projection of the film carried thereby, said case including a top and a bottom wall spaced apart, said bottom wall having spindle receiving means, and an enclosing side wall having two spaced openings for exposing a length of film extending therebetween and passing from one of said coils to the other thereof, the portion of the side wall between said openings being formed with a re-entrant recess across which said exposed length of film passes, and said apparatus including an irregularly shaped housing, said housing including a substantially flat compartment, a spindle extending from said flat compartment in a direction substantially normal thereto, a first extension from said housing in a direction substantially normal thereto and parallel to said spindle, said extension being of such size and contour and so disposed in relation to said spindle that while said case is positioned upon said apparatus with said spindle in operative relation with said spindle receiving means of said case said structure is disposed within said recess with the periphery of said structure in contact with the wall of the case which forms said recess whereby said structure cooperates with said spindle in predeterminedly positioning said case upon said apparatus, the portion of said first extension not in contact with said wall including a film contacting surface disposed across the opening of said recess, while said case is positioned upon said apparatus, for guiding the film thereacross and between said openings of said case, a second extension from said housing in the same direction as said first extension and parallel thereto and slightly spaced therefrom, an apertured presser member for holding the film in operative relation to said film contacting surface, a shutter mounted within said second extension for cooperation with the aperture of said presser member, and means within the main body of said housing for operating said spindle and said shutter.

22. Apparatus according to claim 21, including a movable cover mounted upon said housing and of such shape and size as to cover the length of film which is exposed while said case is disposed upon said apparatus.

23. In combination, a film carrying case and a film handling apparatus, said case being adapted to house both the delivery coil and the take-up coil of a film and to be inserted into said apparatus for the exposure or projection of the film carried thereby, said case including a top and a bottom wall spaced apart, and an inclosing side wall having two spaced openings for exposing a length of film extending therebetween and passing from one of said coils to the other thereof, the portion of the side wall between said openings being formed with a re-entrant recess across which said exposed length of film passes, and said apparatus including a substantially flat compartment, means upon said apparatus for positioning said case thereupon in predetermined relation thereto, a structure extending from said flat compartment in a direction substantially normal thereto and of such size and contour and so disposed upon said compartment that while said case is positioned upon said apparatus said structure is disposed within said recess with the periphery of said structure in contact with the wall of the case which forms said recess whereby said structure cooperates with said spindle in predeterminedly positioning said case upon said apparatus, the portion of said structure other than that which cooperates with said recess being formed with an aperture, light reflecting means disposed within said structure in cooperation with said aperture, and a source of light disposed within said flat compartment for passing light to said light reflecting means.

24. Apparatus according to claim 23, said apparatus including means for feeding the film from one of said openings to the other across said recess, and mechanism for driving said feeding means disposed within said compartment.

GEORGE WILLIAM FORD.